Patented May 18, 1954

2,678,941

UNITED STATES PATENT OFFICE 2,678,941

PRODUCTION OF AROMATIC DINITRILES

Louis L. Ferstandig, El Cerrito, Calif., assignor to California Research Corporation, San Francisco, Calif., a corporation of Delaware No Drawing. Application January 2, 1953,
Serial No. 329,471

4 Claims. (Cl. 260—465)

This invention relates to the production of aromatic dinitriles and, more particularly, to the production of phthalonitriles from benzene dicarboxylic acids and ammonia.

The phthalonitriles which are prepared according to the process of the present invention are superior intermediates for the preparation of synthetic fiber-forming linear polymers, pharmaceuticals and resins.

Organic carboxylic acids may be reacted with ammonia to give the corresponding nitriles. It is generally thought that an ammonium salt of the carboxyl group is formed initially and then dehydrated to give, first, the amide and, finally, the nitrile.

In the case of organic dicarboxylic acids, both carboxyl groups would be expected to react with ammonia to form the dinitrile as the major product. Contrary to such expectations, however, it has been found that when benzene dicarboxylic acids are reacted with ammonia under ordinary temperature conditions, a mixture containing considerable amounts of the mononitrile or cyanobenzoic acid is formed.

It is, therefore, an object of the invention to provide a method for the production of aromatic dinitriles from aromatic dicarboxylic acids and ammonia.

It is another object of the invention to provide a process for the production of aromatic dinitriles in high yields by the non-catalytic reaction of aromatic dicarboxylic acids and ammonia.

It is a further more specific object of the invention to provide a method wherein benzene dicarboxylic acids and ammonia are reacted to give excellent yields of phthalonitrile.

These and still other objects of the invention will be obvious to those skilled in the art from the following description.

It has been found that isophthalic acid can be converted to isophthalonitrile in unusually high yields while concurrently suppressing the formation of meta-cyanobenzoic acid by contacting the isophthalic acid with ammonia at elevated temperatures below about 310° C.

Although it is possible to convert any of the isomers of benzene dicarboxylic acid, the meta-isomer, isophthalic acid, is preferred. Ammonium salts of the benzene dicarboxylic acids in either dry form or aqueous solution have also been found to be quite satisfactory as starting materials.

The temperatures in the process may be any elevated temperatures below about 310° C. at which the nitrile is formed. They may vary over a range having as its lower limit the temperature at which dehydration occurs in the reaction of the aromatic dicarboxylic acid and the ammonia and, as its upper limit, a temperature of about 310° C. The aforementioned "dehydration temperature" is readily determinable in the reaction as, for example, by observing the temperature at which water vapor begins to form and condense. For present purposes temperatures in the range of from about 180° C. to about 310° C. and, more particularly, in the range from about 280° C. to about 310° C. are preferred.

The proportions of aromatic dicarboxylic acid and ammonia may be varied widely. Generally speaking, the ammonia in the reaction is employed in excess of the stoichiometrical proportions necessary to give the dinitrile. However, less than stoichiometrical amounts of ammonia may be used with little effect on the ultimate yield merely by recycling the unreacted aromatic dicarboxylic acids. For the present it is preferred to provide an excess of ammonia to the reaction in the form of a constant stream, the excess unreacted portion of ammonia being recovered with the reaction products and separated for reuse as desired.

The process may be carried out at atmospheric, sub-atmospheric or superatmospheric pressures. Atmospheric pressure is presently preferred, since it avoids the use of expensive pressure equipment or vacuum producing apparatus.

The process of the invention may be carried out as either a batch or a continuous process. In either process the reaction is the same. The aromatic dicarboxylic acid is maintained at the desired temperature in contact with ammonia in a reaction zone and the reaction products are withdrawn in vapor phase and separated by conventional means. In a batch type of process, for example, solid aromatic dicarboxylic acid may be conveniently heated to the desired temperature in a vessel suitable for distilling solids, and a continuous stream of ammonia passed through the vessel. The distilled reaction products in the stream of excess ammonia are then recovered by suitable means. In the continuous type of process the solid aromatic dicarboxylic acid may be introduced continuously as, for example, in continuous conveyors or in the form of a fluidized solid feed in a stream of ammonia. The reaction products and unreacted ammonia are continuously withdrawn and sent to a separation process in which the dinitriles are recovered by suitable means and the unconverted materials are separated and recycled to the process.

The following specific examples are submitted in further illustration of the invention:

Example 1

166 g. of isophthalic acid (1 mole) were heated in a stream of ammonia in a flask equipped with a head for the distillation of solids. The pot temperature was allowed to rise freely. As it reached 300 to 350° C., the vapor temperature rose to between 300 and 325° C. and distillation began. The distillate, a white solid, weighed 137 g.

The solid distillate was separated into a neutral portion and an acid portion by slurrying the ground product in an aqueous sodium carbonate solution, filtering off the insoluble neutral solid, and precipitating the acids from the carbonate solution with concentrated hydrochloric acid. 14.3 g. of neutral material and 72.0 g. of acid were obtained. The discrepancy between the weight of the solid distillate and the weight of the separated portions was due to the loss of ammonia from the ammonium salts of the acids and to the solubility of the acids in water.

The neutral material was characterized as crude isophthalonitrile by its melting point of 154° C. Recrystallization yielded 11.0 g. of pure isophthalonitrile having a melting point of 161° C. On the basis of isophthalic acid consumed, the yield of isophthalonitrile was 23.5 mole per cent.

Example 2

166 g. of isophthalic acid (1 mole) were heated in a stream of ammonia in a flask, as described in Example 1. The reaction temperature was maintained at 310° C. throughout the reaction. During an 8-hour period, the overhead vapor temperature remained between 280° C. and 288° C. Finally, the overhead temperature reached 324° C. as all of the distillable material was removed from the pot. The distillate, a solid white material, weighed 107 g. Upon analysis it was found to contain 47.7 g. of isophthalonitrile. On the basis of isophthalic acid consumed, this amounted to a yield of 74.5 mole per cent.

Example 3

166 g. of isophthalic acid (1 mole) were heated in a stream of ammonia in a flask equipped with a head for the distillation of solids. The pot temperature was raised to 350° C. before the ammonia was passed in. Water distilled off immediately and the overhead temperature rose to 315° C. 123 g. distilled in the range of 315 to 345° C. in a 4-hour period. Analysis of the distillate showed 63.3 g. of meta-cyanobenzoic acid and 55.9 g. of isophthalic acid. No isophthalonitrile was formed.

The advantages of the present process for the production of phthalonitriles are believed readily apparent from the above examples and description of the invention. The yield of phthalonitrile obtained in the process according to this invention, as shown by Example 2, is more than triple that obtainable by the conventional noncatalytic reaction of benzene dicarboxylic acid and ammonia involving no temperature control, as shown by Example 1. In the case of temperatures entirely above 325° C., as shown by Example 3, no phthalonitrile whatsoever was produced. The reactants for the process are generally available and the use of expensive catalyst is avoided along with the more costly and complicated methods of handling it.

I claim:

1. A process for converting isophthalic acid to isophthalonitrile and concurrently suppressing the formation of metacyanobenzoic acid which comprises contacting isophthalic acid with ammonia at an elevated temperature below 310° C.

2. A process for converting isophthalic acid to isophthalonitrile and concurrently suppressing the formation of meta-cyanobenzoic acid which comprises contacting isophthalic acid with ammonia at a temperature between about 180° C. and about 310° C.

3. A process for converting isophthalic acid to isophthalonitrile and concurrently suppressing the formation of meta-cyanobenzoic acid which comprises contacting isophthalic acid with ammonia at a temperature between about 280° C. and about 310° C.

4. A process for converting isophthalic acid to isophthalonitrile and concurrently suppressing the formation of meta-cyanobenzoic acid which comprises heating isophthalic acid in a vessel equipped for distilling solids at a temperature between about 280° C. and about 310 C. in a continuous stream of ammonia and separating isophthalonitrile from the distillate.

No references cited.